United States Patent
Shiga et al.

(10) Patent No.: US 8,138,298 B2
(45) Date of Patent: Mar. 20, 2012

(54) GOLF BALL

(75) Inventors: Kazuyoshi Shiga, Kobe (JP); Takashi Sasaki, Kobe (JP); Mikio Yamada, Kobe (JP)

(73) Assignee: SRI Sports Limited, Kobe-Shi (JP)

( * ) Notice: Subject to any disclaimer, the term of this patent is extended or adjusted under 35 U.S.C. 154(b) by 404 days.

(21) Appl. No.: 12/470,516

(22) Filed: May 22, 2009

(65) Prior Publication Data

US 2009/0318246 A1  Dec. 24, 2009

(30) Foreign Application Priority Data

Jun. 20, 2008  (JP) ................................ 2008-161921

(51) Int. Cl.
*A63B 37/12* (2006.01)
*A63B 37/00* (2006.01)
*C08G 18/48* (2006.01)

(52) U.S. Cl. .............. 528/76; 528/65; 528/66; 525/410; 473/378

(58) Field of Classification Search ........................ None
See application file for complete search history.

(56) References Cited

U.S. PATENT DOCUMENTS

| | | | | |
|---|---|---|---|---|
| 5,282,929 | A * | 2/1994 | Dorai et al. ..................... | 203/91 |
| 6,309,313 | B1 * | 10/2001 | Peter .............................. | 473/378 |
| 2003/0088048 | A1 * | 5/2003 | Wu ................................. | 528/76 |
| 2006/0094538 | A1 * | 5/2006 | Kennedy et al. .............. | 473/371 |
| 2006/0252578 | A1 * | 11/2006 | Nagasawa et al. ............ | 473/371 |

FOREIGN PATENT DOCUMENTS

| | | | |
|---|---|---|---|
| DE | 102004045619 | * | 4/2006 |
| JP | 2007-98140 A | | 4/2007 |

* cited by examiner

*Primary Examiner* — David Buttner
(74) *Attorney, Agent, or Firm* — Birch, Stewart, Kolasch & Birch, LLP (57) ABSTRACT

The object of the present invention is to provide a golf ball having excellent scuff resistance and spin performance. The present invention provides a golf ball which comprises a core and a cover covering the core. The cover contains a polyurethane as a resin component, and the polyurethane is obtained by employing a multimodal polyol having multimodality in molecular weight distribution, as a high-molecular-weight polyol component constituting the polyurethane.

4 Claims, 5 Drawing Sheets

FIG. 7

GOLF BALL

FIELD OF THE INVENTION

The present invention relates to a golf ball having excellent scuff resistance and spin performance.

DESCRIPTION OF THE RELATED ART

Conventionally, ionomer resins are used as a resin component constituting the cover of a golf ball. However, a problem has been pointed out that a cover containing an ionomer resin has deteriorated scuff resistance due to high rigidity and hardness thereof, and provides insufficient spin performance, resulting in inferior controllability. For that reason, polyurethanes are also used as a resin component constituting a cover because it improves scuff resistance and spin properties as compared to ionomer resins.

As a golf ball containing a polyurethane as a resin component constituting a cover, for example, Japanese Patent Publication No. 2007-98140 A discloses a golf ball including a core and at least one layer positioned around the core. The layer contains a composition produced from a prepolymer and a curing agent, and the prepolymer is produced from a blend of an isocyanate and two or more telechelic polyahls. The first telechelic polyahl has a first functionality of 3 or greater and a first polydispersity, the second telechelic polyahl has a second functionality of 1.6 to 2.3 and a second polydispersity, and the layer has improved shear resistance.

SUMMARY OF THE INVENTION

For the golf ball disclosed in Japanese Patent Publication No. 2007-98140 A, moisture absorption resistance is discussed. However, the balance between scuff resistance and spin performance is insufficient, and there is room for improvement in this point.

The present invention has been achieved in view of the above circumstances. The object of the present invention is to provide a golf ball having excellent scuff resistance and spin performance.

The golf ball of the present invention that has solved the above problems is a golf ball comprising a core and a cover covering the core. The cover contains a polyurethane as a resin component, and the polyurethane is obtained by employing a multimodal polyol having multimodality in molecular weight distribution, as a high-molecular-weight polyol component constituting the polyurethane.

In the present invention, by employing a polyurethane as a resin component constituting a cover, a golf ball with excellent spin performance is obtained. Further, the polyurethane has hard segments each consisting of a polyisocyanate component and a chain extender component, and soft segments each consisting of a high-molecular-weight polyol component. The high-molecular-weight polyol components are normally in a contracted state, and the hard segments of the adjacent polyurethane molecules are bonded to each other by hydrogen bond. In the present invention, by using a multimodal polyol as a high-molecular-weight polyol component constituting the polyurethane, a high-molecular-weight polyol component having a relatively low molecular weight and a high-molecular-weight polyol component having a relatively high molecular weight are present in one molecule of the polyurethane. Thus, when an external force is applied to the polyurethane to stretch the high-molecular-weight polyol component, the hard segments of the adjacent polyurethane molecules are misaligned due to the difference in chain length between the polyol component having a relatively low molecular weight and the polyol component having a relatively high molecular weight, thereby cutting the hydrogen bonds between the hard segments. When an external force is applied to a degree so as to cause a scuff in the cover, the energy is to be consumed for cutting the hydrogen bonds between the hard segments as described above. Thus, it is thought that the polyurethane molecules become more difficult to be cut and the scuff resistance improves.

Preferably, the multimodal polyol is a bimodal poly(tetramethylene ether glycol) having bimodality in molecular weight distribution. Further, suitably, the bimodal poly(tetramethylene ether glycol) is a mixture obtained by mixing a poly(tetramethylene ether glycol) (PTMG 1000) having a number average molecular weight of 900 to 1100, and a poly(tetramethylene ether glycol) (PTMG 2000) having a number average molecular weight of 1800 to 2200, in a mole ratio (PTMG 1000/PTMG 2000) of 2/8 to 7/3.

Preferably, the polyurethane contains 4,4'-dicyclohexylmethane diisocyanate as a polyisocyanate component constituting the polyurethane. Further, preferably, the polyurethane contains 1,4-butanediol as a chain extender component constituting the polyurethane.

According to the present invention, a golf ball having excellent scuff resistance and spin performance is obtained.

BRIEF DESCRIPTION OF THE DRAWINGS

In FIGS. 1 and 2, 1a denotes polyurethane molecule using short-chain-length high-molecular-weight polyol, 1b denotes polyurethane using long-chain-length high-molecular-weight polyol, 1c denotes polyurethane using bimodal polyol, 2 denotes hard segment, 3a denotes short-chain-length high-molecular-weight polyol component and 3b denotes long-chain-length high-molecular-weight polyol component.

DESCRIPTION OF THE PREFERRED EMBODIMENT

A golf ball of the present invention comprises a core and a cover covering the core. The cover contains a polyurethane as a resin component, and the polyurethane is obtained by employing a multimodal polyol having multimodality in molecular weight distribution, as a polyol component constituting the polyurethane.

The polyurethane contained as the resin component in the cover of the present invention will be described.

The polyurethane used in the present invention is not particularly limited as long as it is obtained by employing a multimodal polyol having multimodality in molecular weight distribution, as a high-molecular-weight polyol component constituting the polyurethane, and has a plurality of urethane bonds in the molecule. For example, the polyurethane is a reaction product obtained by reacting a high-molecular-weight polyol component with a polyisocyanate component to form urethane bonds in the molecule thereof, where necessary, obtained by further carrying out a chain extension reaction with a chain extender such as a low-molecular-weight polyol, a low-molecular-weight polyamine, or the like.

The reason why the scuff resistance of the golf ball improves by employing a multimodal polyol as the high-molecular-weight polyol constituting the polyurethane is not necessarily clear but thought to be as follows.

Figure 1:
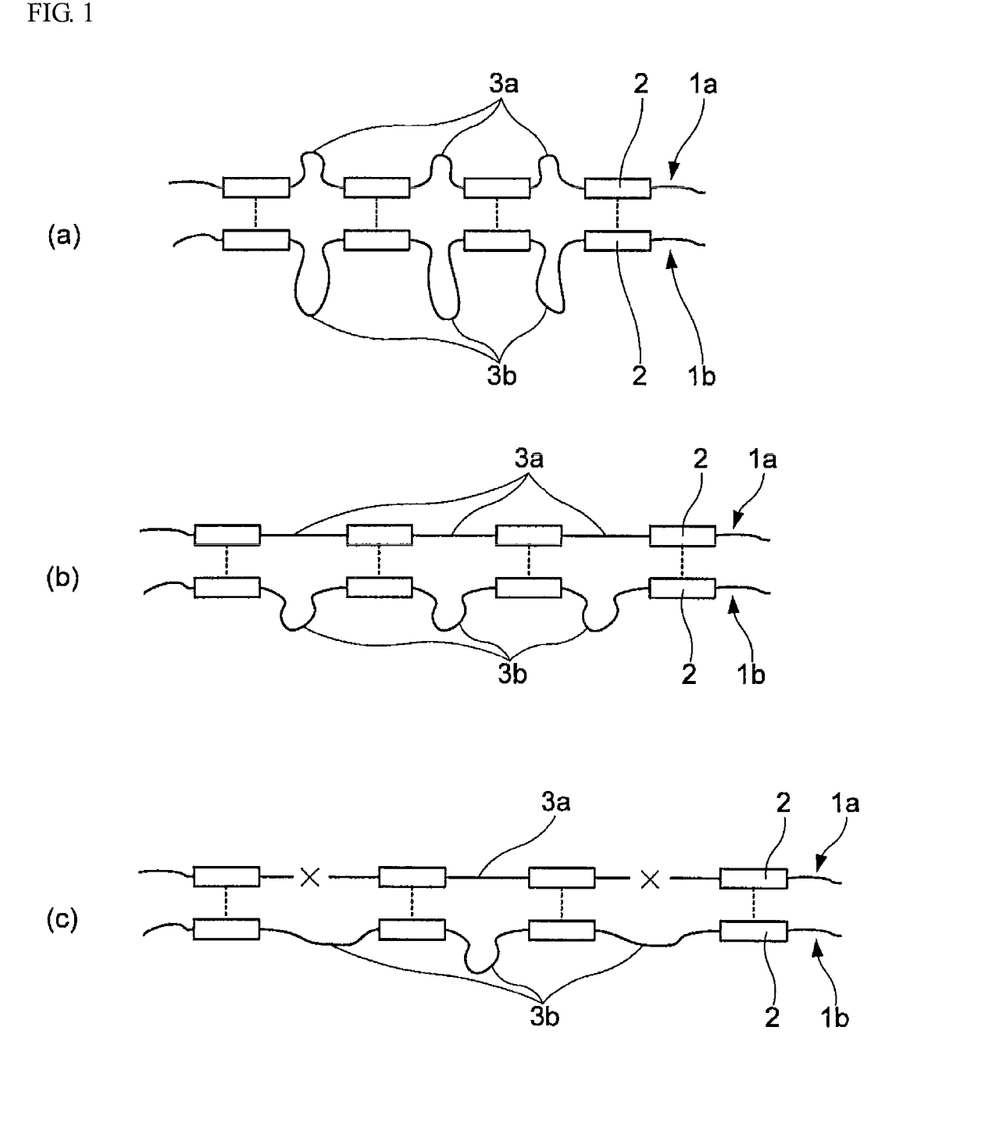
FIG. 1 is a schematic view explaining stretching of a polyurethane mixture.
Figure 2:
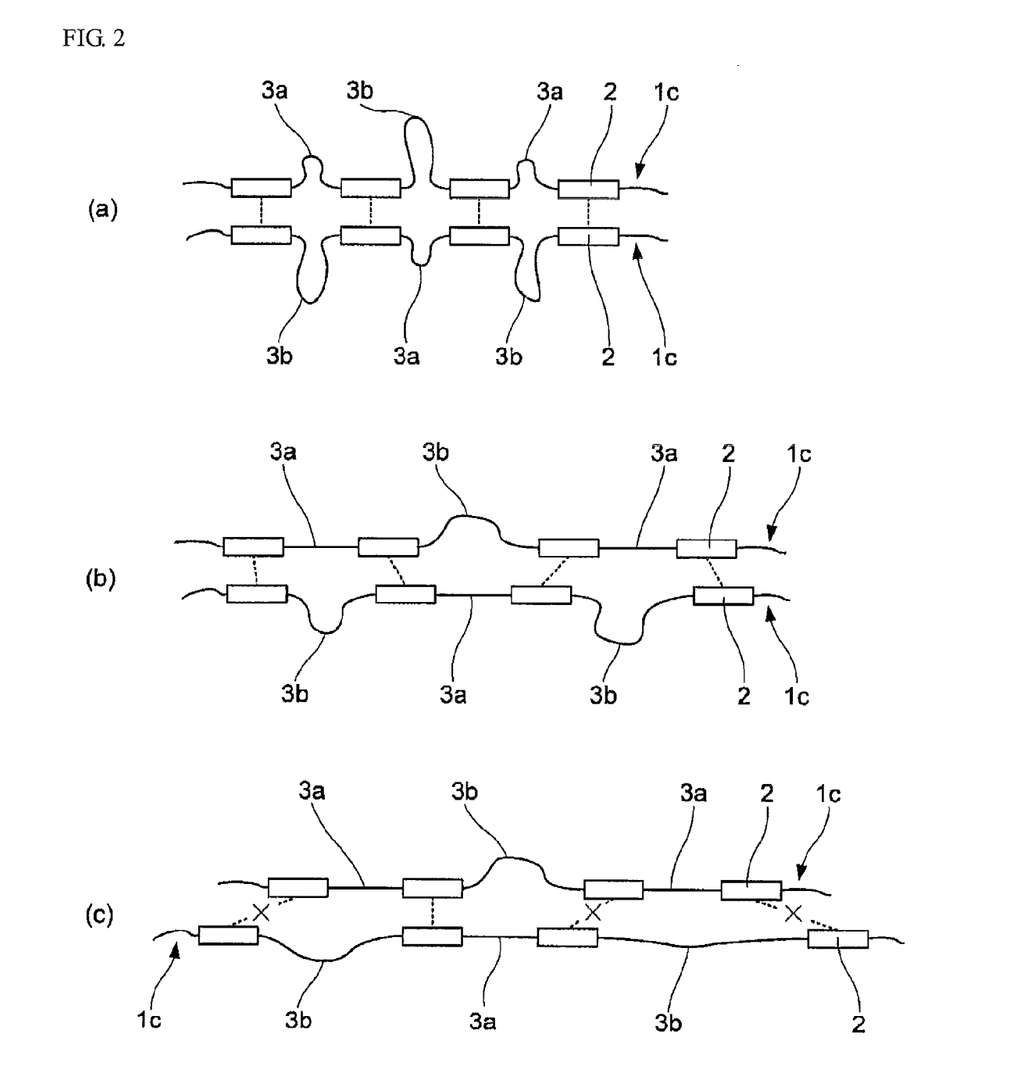
FIG. 2 is a schematic view explaining stretching of a bimodal polyurethane.

Hereinafter, a mechanism of improving the scuff resistance of the golf ball will be described with reference to FIGS. 1 and 2. FIG. 1 is a schematic view showing the mixture of: a short-chain-length high-molecular-weight polyol polyurethane 1a obtained using a short-chain-length high-molecular-weight polyol 3a having a relatively low molecular weight as a high-molecular-weight polyol constituting the polyurethane; and a long-chain-length high-molecular-weight polyol polyurethane 1b obtained employing a long-chain-length high-molecular-weight polyol 3b having a relatively high molecular weight as a high-molecular-weight polyol constituting the polyurethane. FIG. 2 is a schematic view showing a bimodal polyurethane 1c obtained employing a bimodal polyol as a polyol component constituting the polyurethane. It is noted that in FIGS. 1 and 2, dotted lines indicate hydrogen bonds between hard segments.

As shown in FIGS. 1 and 2, the polyurethane molecules 1a, 1b, and 1c each have hard segments 2 consisting of a polyisocyanate component and a chain extender component, and soft segments each consisting of a high-molecular-weight polyol component 3a or 3b. Then, as shown in FIGS. 1(a) and 2(a), the high-molecular-weight polyol components 3a and 3b are normally in a contracted state, and the hard segments of the adjacent polyurethane molecules 1a, 1b and 1c are bonded to each other by hydrogen bonding. When an external force is applied to the polyurethanes, the high-molecular-weight polyol components are stretched as shown in FIGS. 1(b) and 2(b). In this case, first, the short-chain-length high-molecular-weight polyol components 3a are stretched to the limit.

Next, when an external force is further applied in the state where the short-chain-length high-molecular-weight polyol components 3a are stretched to the limit as described above, in the polyurethane mixture, as shown in FIG. 1(c), the long-chain-length high-molecular-weight polyol polyurethane 1b can be stretched further but the short-chain-length high-molecular-weight polyol polyurethane 1a is cut because it cannot be stretched further. As a result, a scuff occurs in the cover.

On the other hand, in the bimodal polyurethane 1c, each molecule has a long-chain-length high-molecular-weight polyol component 3b, and can be stretched further. Thus, the polyurethane molecules are not cut and a scuff does not occur in the cover. Further, in this case, the hard segments 2 are misaligned due to the difference in chain length between the short-chain-length high-molecular-weight polyol components 3a and the long-chain-length high-molecular-weight polyol components 3b, thereby cutting the hydrogen bonds between the hard segments 2 as shown in FIG. 2(c). That is, when an external force is applied so as to cause a scuff in the cover, the energy is though to be consumed for cutting the hydrogen bonds between the hard segments 2 as described above. Thus, it is thought that the polyurethane molecules become more difficult to cut and the scuff resistance improves further.

The multimodal polyol used in the present invention will be described.

Figure 3:
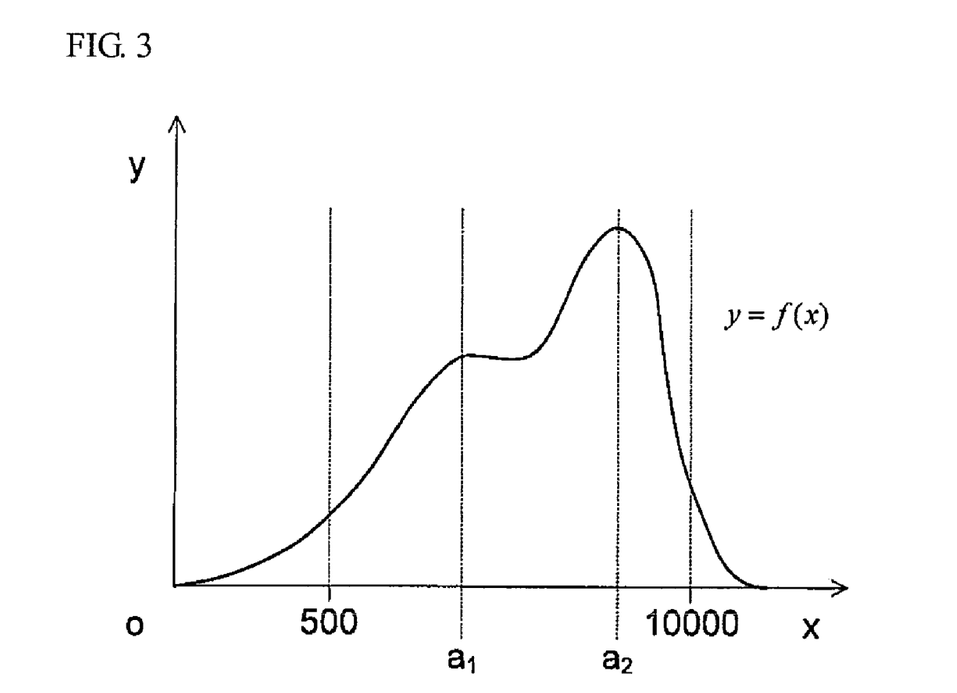
FIG. 3 is a view showing the molecular weight distribution curve of a bimodal polyol, for which the y axis indicates a molar concentration fraction and the x axis indicates a molecular weight.

The multimodal polyol is a high-molecular-weight polyol whose molecular weight distribution has multimodality. Here, a polyol having multimodality in molecular weight distribution means that when a molecular weight distribution curve for which the horizontal axis (x axis) indicates a molecular weight and the vertical axis (y axis) indicates a molar concentration fraction is represented by the following formula (1), the molecular weight distribution curve has two or more peaks in a molecular weight range between 500 and 10000. It is noted that a polyol whose molecular weight distribution curve has two peaks in a molecular weight range between 500 and 10000 is referred to as a bimodal polyol. Specifically, as shown in FIG. 3, a bimodal polyol is a high-molecular-weight polyol whose molecular weight distribution curve has two peaks at a relatively low molecular weight ($a_1$) and a relatively high molecular weight ($a_2$), respectively, in a molecular weight range between 500 and 10000.

[Mathematical formula 1]

$$y = f(x) \tag{1}$$

y: Concentration fraction x: Molecular weight

Here, even when a molecular weight distribution has multimodality, if, for example, in a bimodal polyol, the difference ($|a_1 - a_2|$) between the molecular weight ($a_1$) and the molecular weight ($a_2$) at the peaks is small, one of the peaks becomes a shoulder peak for the other peak in the obtained molecular weight distribution curve, and hence the molecular weight distribution may seem to be monomodal. In this case, whether or not the molecular weight distribution has multimodality can be determined by using the following formula (2) which is the second derivative of the above formula (1). In other words, if a differential curve represented by the following formula (2) has two or more minimum values in a molecular weight range between 500 and 10000, the molecular weight distribution is determined to have multimodality.

[Mathematical formula 2]

$$\frac{d^2 y}{dx^2} = \frac{d^2}{dx^2} f(x) \tag{2}$$

Figure 4:
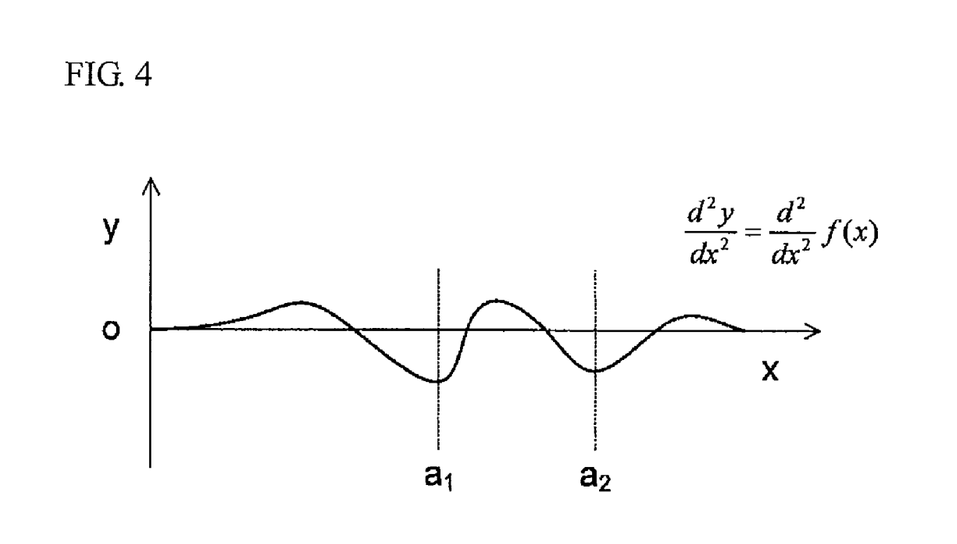
FIG. 4 is a view showing a curve of the second derivative of the molecular weight distribution curve shown in FIG. 3.

Specifically, when the molecular weight distribution curve represented by the above formula (1) is bimodal having two peaks at the molecular weight ($a_1$) and the molecular weight ($a_2$) as shown in FIG. 3, the second derivative represented by the above formula (2) has minimum values at the molecular weight ($a_1$) and the molecular weight ($a_2$), respectively, as shown in FIG. 4.

Further, the above formula (2) having two or more minimum values means to have two or more of "a (molecular weight)" that satisfy the following formulas (5) and (6) where the third derivative of the above formula (1) is represented by the following formula (3) and the fourth derivative of the above formula (1) is represented by the following formula (4).

[Mathematical formula 3]
$$\frac{d^3y}{dx^3} = \frac{d^3}{dx^3}f(x) \quad (3)$$

[Mathematical formula 4]
$$\frac{d^4y}{dx^4} = \frac{d^4}{dx^4}f(x) \quad (4)$$

[Mathematical formula 5]
$$\frac{d^3y}{dx^3} = \frac{d^3}{dx^3}f(a) = 0 \quad (5)$$

[Mathematical formula 6]
$$\frac{d^4y}{dx^4} = \frac{d^4}{dx^4}f(a) > 0 \quad (6)$$

Figure 5:
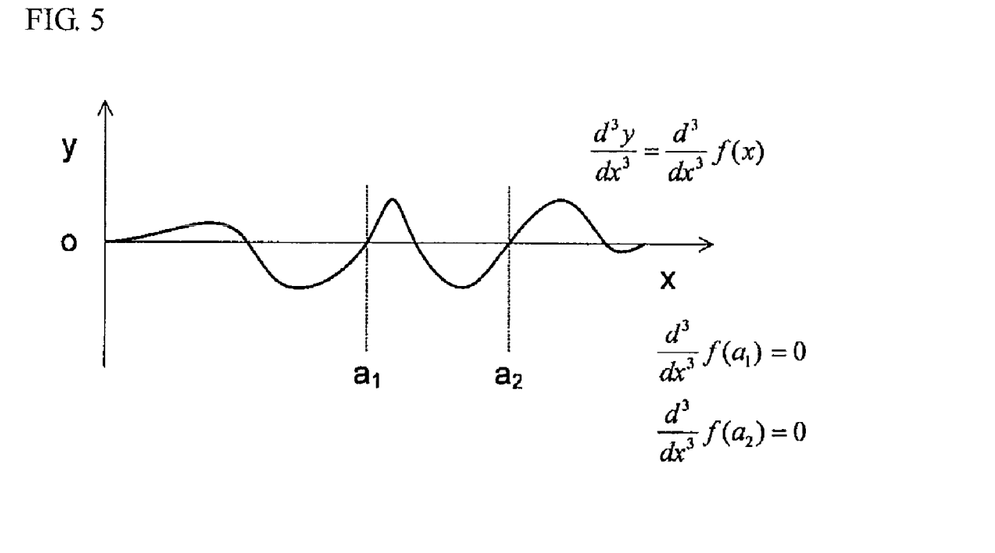
FIG. 5 is a view showing a curve of the third-order derivative of the molecular weight distribution curve shown in FIG. 3.
Figure 6:
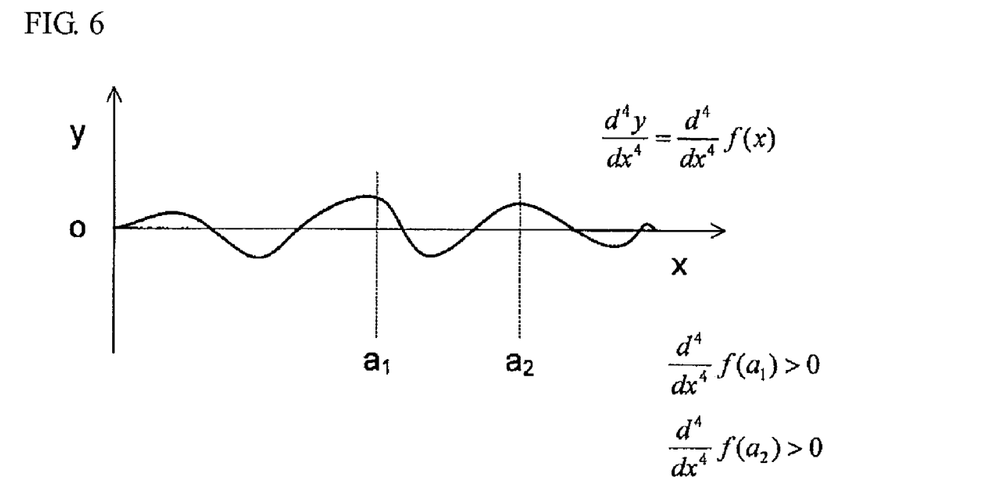
FIG. 6 is a view showing a curve of the fourth-order derivative of the molecular weight distribution curve shown in FIG. 3.

In other words, as shown in FIG. 3, the molecular weight distribution curve represented by the above formula (1) is bimodal having two peaks at the molecular weights $a_1$ and $a_2$, these molecular weights $a_1$ and $a_2$ satisfy the above formula (5) for the third derivative shown in FIG. 5 and satisfy the above formula (6) for the fourth derivative shown in FIG. 6.

In the present invention, the molecular weight distribution curve of a polyol is a molecular weight distribution curve, which is derived from values obtained using gel permeation chromatography under the following measuring conditions, and for which the vertical axis (y axis) indicates a molar concentration fraction and the horizontal axis (x axis) indicates a molecular weight.

Measuring Conditions

Apparatus: HLC-8120GPC, manufactured by Tosoh Corporation

Eluent: THF

Temperature: 40° C.

Column: TSK gel Super HM-M (manufactured by Tosoh Corporation)

Polyol concentration: 0.2% by mass (polyol/(polyol+THF))

Sample injection volume: 5 μl

Flow rate: 0.5 ml/min

Molecular weight standard: polystyrene (PSt Quick Kit-H, manufactured by Tosoh Corporation)

The multimodal polyol is not particularly limited, as long as it is a high-molecular-weight polyol having multimodality in molecular weight distribution, but a bimodal polyol is particularly preferable.

Here, regarding the molecular weight distribution of a bimodal polyol, the bimodal polyol has two peaks, one of which in the low molecular weight side is represented by $a_1$ and the other in the high molecular weight side is represented by $a_2$ ($a_1 < a_2$), the ratio ($a_2/a_1$) of the molecular weight ($a_1$) and the molecular weight ($a_2$) is preferably 1.3 or more, more preferably 1.5 or more, and even more preferably 2 or more, and is preferably 4 or less, more preferably 3.5 or less, and even more preferably 3 or less. If the ratio ($a_2/a_1$) of the molecular weight ($a_1$) and the molecular weight ($a_2$) is within the above range, the scuff resistance of the resultant golf ball improves further.

Further, regarding molar concentration fractions of the two peaks, where the concentration fraction at the peak on the low molecular weight side is represented by $f(a_1)$ and the concentration fraction at the peak on the high molecular weight side is represented by $f(a_2)$, the ratio of $(f(a_2)/f(a_1))$ of the molar concentration fractions $f(a_1)$ and $f(a_2)$ is preferably 3/7 or more, more preferably 4/6 or more, and even more preferably 5/5 or more, and is preferably 8/2 or less, more preferably 7/3 or less, and even more preferably 6/4 or less. If the ratio of $(f(a_2)/f(a_1))$ of the molar concentration fractions $f(a_1)$ and $f(a_2)$ is within the above range, the scuff resistance of the resultant golf ball improves further.

The high-molecular-weight polyol employed as the multimodal polyol is not particularly limited, and examples include polyether polyols such as polyoxyethylene glycol (PEG), polyoxypropylene glycol (PPG), poly(tetramethylene ether) glycol (PTMG); condensed polyester polyols (preferably condensed polyester glycol) such as polyethylene adipate (PEA), polybutylene adipate (PBA), polyhexamethylene adipate (PHMA); lactone polyester polyols (preferably lactone polyester glycol) such as poly-ε-caprolactone (PCL); polycarbonate polyols (preferably polycarbonate glycol) such as polyhexamethylene carbonate; acrylic polyols (preferably acrylic glycol); and the like. The high-molecular-weight polyol may be employed alone or the mixture of two or more types of the above high-molecular-weight polyols. Among them, polyether polyols such as polyoxyethylene glycol (PEG), polyoxypropylene glycol (PPG), poly(tetramethylene ether) glycol (PTMG) are preferable, and in particular, poly(tetramethylene ether) glycol (PTMG) is preferably employed.

The number average molecular weight ($M_n$) of the multimodal polyol is preferably 800 or more, more preferably 1000 or more, and even more preferably 1200 or more, and is preferably 8000 or less, more preferably 6000 or less, and even more preferably 4000 or less. If the number average molecular weight of the multimodal polyol ranges from 800 to 8000, the scuff resistance of the resultant golf ball improves further.

The polydispersity represented by the ratio ($M_w/M_n$) of the weight average molecular weight ($M_w$) and the number average molecular weight ($M_n$) of the multimodal polyol is preferably 2 or more, more preferably 2.5 or more, and even more preferably 3 or more, and is preferably 10 or less, more preferably 8 or less, and even more preferably 6 or less. If the polydispersity ($M_w/M_n$) ranges from 2 to 10, the scuff resistance of the resultant golf ball improves further.

As the multimodal polyol employed in the present invention, a mixture obtained by mixing a poly(tetramethylene ether) glycol (hereinafter, referred to as "PTMG 1000") having a number average molecular weight of 900 to 1100 and a poly(tetramethylene ether) glycol (hereinafter, referred to as "PTMG 2000") having a number average molecular weight of 1800 to 2200, in a mole ratio (PTMG1000/PTMG 2000) of 2/8 to 7/3, is preferable. By using such a mixture of poly(tetramethylene ether) glycols, the scuff resistance of the resultant golf ball improves further. The mole ratio (PTMG 1000/PTMG 2000) is preferably 2/8 or more and more preferably 3/7 or more, and is preferably 7/3 or less and more preferably 6/4 or less.

The number average molecular weight of the PTMG 1000 is preferably 920 or more and more preferably 950 or more, and is preferably 1070 or less and more preferably 1050 or less. Further, the ratio ($M_w/M_n$) of the number average molecular weight ($M_n$) and the weight average molecular weight ($M_w$) of the PTMG 1000 is preferably 1 or more, and is preferably 2.9 or less, more preferably 2.5 or less, and even more preferably 2.1 or less.

The number average molecular weight of the PTMG 2000 is preferably 1840 or more and more preferably 1900 or more, and is preferably 2140 or less and even more preferably 2100 or less. Further, the ratio ($M_w/M_n$) of the number average molecular weight ($M_n$) and the weight average molecular weight ($M_w$) of the PTMG 2000 is preferably 1 or more, and is preferably 2.9 or less, more preferably 2.5 or less, and even more preferably 2.1 or less. The number average molecular weights ($M_n$) of the PTMG 1000 and the PTMG 2000 and the ratios ($M_w/M_n$) of the number average molecular weights ($M_n$) and the weight average molecular weights ($M_w$) of the PTMG 1000 and the PTMG 2000 may be measured under the same conditions as that for the multimodal polyol.

The multimodal polyol being the mixture of the PTMG 1000 and the PTMG 2000 and the mole ratio thereof can be confirmed by analyzing the molecular weight distribution curve of the multimodal polyol. In other words, the molecular weight distribution curve of the multimodal polyol is analyzed using FIGS. 3 to 6 as described above, to obtain the number of peaks. The obtained number of peaks corresponds to the number of polyol components constituting the multimodal polyol. Next, each peak is separated from the others, assuming that each peak is according to the normal distribution. At this time, a condition of an area ratio, which causes the sum of peak areas of the separated peaks to be closest to the area of the original molecular weight distribution curve, is obtained. Examples of a method for obtaining the condition include a simplex method, a DFP method, a Gauss-Newton method, and the like. Then, the mole ratio of each polyol component constituting the multimodal polyol can be confirmed from the obtained area ratio of each peak area.

The polyisocyanate component, which constitutes the polyurethane is not limited as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylynediisocyanate ($H_6$XDI), hexamethylene diisocyanate (HDI), isophorone diisocyanate (IPDI), and norbornene diisocyanate (NBDI). These may be used either alone or as a mixture of at least two of them.

In view of improving the scuff resistance, the aromatic polyisocyanate is preferably used as the polyisocyanate component of the polyurethane. A use of the aromatic polyisocyanate improves the mechanical property of the obtained polyurethane and provides the cover having the excellent scuff resistance. In addition, in view of improving the weather resistance, as the polyisocyanate component of the polyurethane, a non-yellowing type polyisocyanate such as TMXDI, XDI, HDI, $H_6$XDI, IPDI and $H_{12}$MDI is preferably used. More preferably, 4,4'-dicyclohexylmethane diisocyanate ($H_{12}$MDI) is used. Since 4,4'-dicyclohexylmethane diisocyanate ($H_{12}$MDI) has a rigid structure, the mechanical property of the resulting polyurethane is improved, and thus the cover which is excellent in scuff resistance can be obtained.

The chain extender component which may constitute the polyurethane includes a low-molecular weight polyol, a low-molecular weight polyamine and the like. Examples of the low-molecular weight polyol may include a diol such as ethylene glycol, diethylene glycol, triethylene glycol, propanediol (e.g., 1,2-propanediol, 1,3-propanediol, and 2-methyl-1,3-propanediol), dipropylene glycol, butanediol (e.g., 1,2-butanediol, 1,3-butanediol, 1,4-butanediol, 2,3-butanediol, and 2,3-dimethyl-2,3-butanediol and the like), neopentyl glycol, pentanediol, hexanediol, heptanediol, octanediol, 1,6-cyclohexanedimethylol, an aniline diol, and bisphenol A diol; a triol such as glycerin, trimethylol propane, and hexanetriol; a tetraol or a hexanol such as pentaerythritol and sorbitol. Among them, a diol such as ethylene glycol, diethylene glycol, triethylene glycol, propanediol, dipropylene glycol and butanediol are preferable. Typically, butanediol is preferred used.

The low-molecular weight polyamine that can be used as a chain extender may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine.

The aromatic polyamine has no limitation as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, tolylenediamine, diethyltoluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly (aminobenzene) having at least two aminophenyl groups directly bonded to each other or a compound having at least two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane or the derivatives thereof.

A molecular weight of the low-molecular weight polyol used as the chain extender component is preferably 400 or less, more preferably 200 or less and even more preferably 150 or less, and a molecular weight of the low-molecular weight polyamine is preferable 800 or less, more preferably 600 or less and even more preferably 400 or less.

The polyurethane has no limitation on the constitutional embodiments thereof. Examples of the constitutional embodiments are the embodiment where the polyurethane is constituted of the multimodal polyol component and polyisocyanate component; the embodiment where the polyurethane is constituted of the multimodal polyol component, the polyisocyanate component and the low-molecular weight polyol component; and the embodiment where the polyurethane is constituted of the multimodal polyol component, the polyisocyanate component, the low-molecular weight polyol component, and the low-molecular weight polyamine component; and the embodiment where the polyurethane is constituted of the multimodal polyol component, the polyisocyanate component and the low-molecular weight polyamine component. Among them, the polyurethane is constituted of the bimodal polyol, the polyisocyanate component and the low-molecular weight of polyamine component is preferable. Especially, the embodiment in which the bimodal polyol as the multimodal polyol, 4,4'-dicyclohexylmethane diisocyanate as the polyisocyanate and 1,4-butanediol are employed is preferred.

The polyurethane is may be a thermoplastic polyurethane or a thermosetting polyurethane. The thermoplastic polyurethane is a polyurethane that exhibits thermoplasticity by application of heat, and generally means a polyurethane with a straight chain structure and a certain degree of a high molecular weight. On the other hand, the thermosetting polyurethane (two-component setting type polyurethane) is a polyurethane obtained by reacting a low-molecular-weight urethane prepolymer with a curing agent (chain extender agent) to undergo polymerization when forming the cover. The thermosetting polyurethane includes a polyurethane with a straight-chain structure or a three-dimensionally crosslinked structure by controlling the number of functional groups in the prepolymer and the curing agent (chain extender) used. The polyurethane used in the present invention is preferably the thermoplastic polyurethane.

The polyurethane can be produced by appropriately combining the high-molecular-weight polyol component, the polyisocyanate component, and the chain extender component. Examples of a method for synthesizing the polyurethane include a one-shot method and a prepolymer method. The one-shot method is a method in which a polyisocyanate component, a polyol component, and the like are simultaneously reacted with each other. The prepolymer method is a method in which a polyisocyanate component, a polyol component, and the like are reacted with each other in multiple steps; for example, first, a low-molecular-weight urethane prepolymer is synthesized, and then the synthesized urethane prepolymer is subsequently polymerized to have a high molecular weight. It is preferred that the polyurethane used in the present invention is produced by the prepolymer method.

The following will describe in detail a case, in which an isocyanate group terminated urethane prepolymer is synthesized and then polymerized with a low-molecular-weight polyol, as an example of producing a polyurethane by the prepolymer method.

First, the multimodal polyol component is reacted with a polyisocyanate component to give an isocyanate group terminated urethane prepolymer. In this case, regarding the blend ratio of the polyisocyanate component to the multimodal polyol component, the mole ratio (NCO/OH) of isocyanate group (NCO) contained in the polyisocyanate component to hydroxyl group (OH) contained in the multimodal polyol component is preferably 1 or more, more preferably 1.2 or more, and even more preferably 1.5 or more, and is preferably 10 or less, more preferably 9 or less, and even more preferably 8 or less.

Further, the temperature for conducting the reaction is preferably 10° C. or higher, more preferably 30° C. or higher, and even more preferably 50° C. or higher, and is preferably 200° C. or lower, more preferably 150° C. or lower, and even more preferably 100° C. or lower. Further, the reaction time for the reaction is preferably 10 minutes or longer, more preferably 1 hour or longer, and even more preferably 3 hours or longer, and is preferably 32 hours or shorter, more preferably 16 hours or shorter, and even more preferably 8 hours or shorter.

Next, the obtained isocyanate group terminated urethane prepolymer is subjected to a chain extension reaction with a chain extender component to obtain a polyurethane. In this case, regarding the blend ratio of the isocyanate group terminated urethane prepolymer to the chain extender component, the mole ratio (NCO/OH) of isocyanate group (NCO) contained in the polyisocyanate component used for the synthesis of the urethane prepolymer to the total amount of hydroxyl group (OH) contained in the chain extender component and hydroxyl group (OH) contained in the multimodal polyol component used for the synthesis of the urethane prepolymer is preferably 0.9 or more, more preferably 0.92 or more, and even more preferably 0.95 or more, and is preferably 1.1 or less, more preferably 1.08 or less, and even more preferably 1.05 or less. The temperature for conducting the chain extension reaction is preferably 10° C. or higher, more preferably 30° C. or higher, and even more preferably 50° C. or higher, and is preferably 220° C. or lower, more preferably 170° C. or lower, and even more preferably 120° C. or lower. The reaction time for the chain extension reaction is preferably 10 minutes or longer, more preferably 30 minutes or longer, and even more preferably 1 hour or longer, and is preferably 20 days or shorter, more preferably 10 days or shorter, and even more preferably 5 days or shorter.

When a low-molecular-weight polyamine is used as a chain extender component, the blend ratio of the isocyanate group terminated urethane prepolymer to the chain extender component may be the same as that in the case of using the low-molecular-weight polyol. In other words, the mole ratio (NCO/($NH_2$+OH)) of isocyanate group (NCO) contained in the polyisocyanate component to the total amount of amino group ($NH_2$) contained in the chain extender component and hydroxyl group (OH) contained in the multimodal polyol component may be adjusted so as to be the same as the mole ratio (NCO/OH) in the case of using the low-molecular-weight polyol.

For synthesizing the polyurethane, a known catalyst may be used. Examples of the catalyst include monoamines such as triethylamine, N,N-dimethylcyclohexylamine; polyamines such as N,N,N',N'-tetramethylethylenediamine, N,N,N',N'',N''-pentamethyldiethylenetriamine, and the like; cyclic diamines such as 1,8-diazabicyclo-[5.4.0]-7-undecene (DBU), triethylenediamine; and tin-based catalysts such as dibutyltin dilaurate, dibutyltin diacetate. Each of these catalysts may be used solely, or two or more of these catalysts may be used in combination. Among these catalysts, tin-based catalysts such as dibutyltin dilaurate, dibutyltin diacetate are preferable, and in particular, dibutyltin dilaurylate is preferably used.

The golf ball of the present invention has improved scuff resistance and spin performance by using a multimodal polyol as the polyol component constituting the polyurethane, and whether or not the polyol component constituting the polyurethane in the formed cover has multimodality can be confirmed as exemplified below.

First, the polyurethane is hydrolyzed by being heated to about 180° C. and stirred under an alkaline condition using solutions such as sodium hydroxide solution. Next, the hydrolyzed sample is mixed with ether or the like to be separated into a water layer and an oil layer, thereby separating the polyol component. Then, the obtained polyol component is subjected to measurement using gel permeation chromatography under the above measuring conditions.

The cover composition of the present invention may contain another resin component as the resin component in addition to the polyurethane as long as it does not impair the effects of the present invention. When the cover of the present invention contains another resin component as the resin component, it is preferred that the principal component of the resin component is the polyurethane. The amount of the polyurethane in the resin component is preferably 50 mass % or more, more preferably 60 mass % or more, and even more preferably 70 mass % or more. Further, it is also preferred that as the resin component, substantially, only the polyurethane is used.

Examples of the other resin component include an ionomer resin, a thermoplastic elastomer, and the like.

Examples of the ionomer resin include one prepared by neutralizing at least a part of carboxyl groups in a copolymer composed of ethylene and α,β-unsaturated carboxylic acid having 3 to 8 carbon atoms with a metal ion, one prepared by neutralizing at least a part of carboxyl groups in a ternary copolymer composed of ethylene, $\alpha,\beta$-unsaturated carboxylic acid having 3 to 8 carbon atoms, and $\alpha,\beta$-unsaturated carboxylic acid ester with a metal ion, or a mixture thereof. Examples of the $\alpha,\beta$-unsaturated carboxylic acids are; acrylic acid, methacrylic acid, fumaric acid, maleic acid and crotonic acid. Among these, acrylic acid and methacrylic acid are particularly preferred. Examples of the $\alpha,\beta$-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferable. Examples of the metal ion for neutralizing at least a part of the carboxyl groups in the copolymer composed of ethylene and the $\alpha,\beta$-unsaturated carboxylic acid or in the terpolymer composed of ethylene, the $\alpha,\beta$-unsaturated carboxylic acid, and the $\alpha,\beta$-unsaturated carboxylic acid ester are; alkali metal ions such as sodium, potassium, and lithium; divalent metal ions such as magnesium, calcium, zinc, barium, and cadmium; trivalent metal ions such as aluminum, or other metal ions such as tin and zirconium. In particular, sodium ion, zinc ion, and magnesium ion are preferably used in view of the resilience and durability of the golf ball.

Specific examples of the ionomer resin include "Himilan (registered trademark)" commercially available from Du Pont-Mitsui Polychemicals Co., Ltd., "Surlyn (registered trademark)" commercially available from E.I. du Pont de Nemours and Company, "Iotek (registered trademark)" commercially available from ExxonMobil Chemical Corporation, and the like.

Specific examples of the thermoplastic elastomer include a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polystyrene elastomer having a trade name "Rabalon (registered trademark)" commercially available from Mitsubishi Chemical Corporation, and the like. Among them, a thermoplastic polystyrene elastomer is preferable. Examples of the thermoplastic polystyrene elastomer include a polystyrene-diene block copolymer having a polystyrene block component as a hard segment, and a diene block component, such as polybutadiene, isoprene, hydrogenated polybutadiene, hydrogenated polyisoprene, and the like, as a soft segment. The polystyrene-diene block copolymer has a double bond derived from a conjugated diene compound of a block copolymer or a partially hydrogenated block copolymer. Examples of the polystyrene-diene block copolymer include a block copolymer with an SBS (styrene-butadiene-styrene) structure having a polybutadiene block, a block copolymer with an SIS (styrene-isoprene-styrene) structure, and the like.

In the present invention, in addition to the aforementioned resin component, the cover may contain a pigment component such as titanium oxide, a blue pigment, a red pigment; a specific gravity modifier such as zinc oxide, calcium carbonate, barium sulfate; a dispersant; an anti-aging agent; an ultraviolet absorber; a light stabilizer; a fluorescent material; a fluorescent brightener; as long as they do not impair the performance of the cover.

The amount of a white pigment (titanium oxide), with respect to 100 parts by mass of the resin component constituting the cover, is preferably 0.5 parts by mass or more and more preferably 1 part by mass or more, and is preferably 10 parts by mass or less and more preferably 8 parts by mass or less. By causing the amount of the white pigment to be 0.5 parts by mass or more, it is possible to provide opacity to the cover. The reason why the amount of the white pigment is preferably 10 parts by mass or less with respect to 100 parts by mass of the thermoplastic polyurethane is that if the amount of the white pigment is more than 10 parts by mass, there is the possibility that the durability of the resultant cover will deteriorate.

The cover of the golf ball of the present invention is produced by molding with the cover composition containing the aforementioned polyurethane as the resin component. In one example of forming the cover, the cover composition is molded into hollow shells, and then the core is covered with a plurality of shells and press-molded (preferably, the cover composition is molded into hollow half shells, and then the core is covered with two half shells and press-molded). In another example, the cover composition is injection-molded directly onto the core.

Half shells are formed by either compression molding or injection molding, but compression molding is preferable. Example of the conditions of forming half shells by press-molding the cover composition include a pressure ranging from 1 MPa to 20 MPa and a molding temperature ranging from the temperature 20° C. lower than the flow initiation temperature of the cover composition to the temperature 70° C. higher than the flow initiation temperature of the cover composition. By conducting the molding under the above conditions, half shells with uniform thickness can be formed. In one example of the method of forming the cover using half shells, the core is covered with two half shells and press-molded. Example of the conditions of forming the cover by press-molding half shells include a molding pressure ranging from 0.5 MPa to 25 MPa, and a molding temperature ranging from the temperature 20° C. lower than the flow initiation temperature of the cover composition to the temperature 70° C. higher than the flow initiation temperature of the cover composition. By conducting the molding under the above conditions, a golf ball cover with uniform thickness can be formed.

In the present invention, the cover of the present invention may be formed by injection-molding the cover composition directly onto the core. When a method that direct-injection-molds the cover composition on the core is used, it is preferred if the upper and lower molds adopted for forming the cover have a hemispherical cavity and pimples, and some of the pimples are extendable and retractable to act also as hold pins. When forming the cover by injection-molding, the cover may be molded by extending out the hold pins to hold the inputted core, injecting the cover composition, and cooling the cover composition. For example; a cover composition heated to a temperature of 150 to 250° C. is injected, within a time duration of 0.5 to 5 seconds, into a closed mold that is held with a pressure of 9 MPa to 15 MPa, and the mold is opened after 10 to 60 seconds of cooling.

When molding a cover, the concave portions called "dimple" are usually formed on the surface. After the cover is molded, the mold is opened and the golf ball body is taken out from the mold, and as necessary, the golf ball body is preferably subjected to surface treatment such as deburring, cleaning, and sandblast. If desired, a paint film or a mark may be formed. There are no limitations on the thickness of the paint film, but preferably 5 μm or larger, and more preferably 7 μm or larger, and preferably 25 μm or smaller, and more preferably 18 μm or smaller. This is because if the thickness is smaller than 5 μm, the paint film is easy to wear off due to continued use of the golf ball, and if the thickness is larger than 25 μm, the effect of dimples is reduced, resulting in deteriorating the flying performance of the golf ball.

In the present invention, the thickness of the cover of the golf ball is preferably 1.0 mm or less, more preferably 0.6 mm or less, and even more preferably 0.5 mm or less. This is because, by causing the thickness of the cover to be 1.0 mm or less, the outer diameter of the core can be increased, thereby improving the resilience performance of the golf ball. There are no limitations on the minimum thickness of the cover, but one example of it is 0.3 mm. If the cover thickness is less than 0.3 mm, there is the possibility that it becomes difficult to mold the cover.

The slab hardness of the cover composition in Shore D hardness is preferably 20 or more and more preferably 25 or more, and is preferably 50 or less and more preferably 45 or less. This is because, if the slab hardness of the cover composition is less than 20, the resilience of the golf ball may deteriorate, thereby decreasing a flight distance. On the other hand, if the slab hardness of the cover composition is more than 50, the durability of the resultant golf ball may deteriorate. For measuring the slab hardness of the cover, sheets with a thickness of about 2 mm are prepared by hot press molding with the cover composition and stored at 23° C. for 2 weeks, three or more of these sheets are stacked on one another so as not to be affected by the measuring base on which the sheets are placed, and the stack is measured with a Shore D type spring hardness tester which complies to ASTM-D2240 standard.

Next, a preferred embodiment of the core of the golf ball of the present invention will be explained. Examples of the structure of the core include a single-layer core; a core consisting of a center and a single-layer intermediate layer covering the center; a core consisting of a center and a plurality piece of intermediate layers or a multi-layer intermediate layer covering the center; and the like. The core is preferably spherical. This is because if the core has a non-spherical shape, the thickness of the cover becomes uneven, and portions with deteriorated cover performance may occur in the cover. On the other hand, while the center is generally spherical, it may be provided with a rib on the surface thereof so that the surface of the spherical center is divided by the ribs, and for example, the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degrees. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

As the core or the center of the golf ball of the present invention, the core molded by, for example, heat-pressing a rubber composition containing a base rubber, a crosslinking initiator, a co-crosslinking agent and as necessary a filler (hereinafter simply referred to as "rubber composition for the core" occasionally) is preferable.

As the base rubber, a natural rubber and/or a synthetic rubber such as a polybutadiene rubber, a natural rubber, a polyisoprene rubber, a styrene polybutadiene rubber, and ethylene-propylene-diene terpolymer (EPDM) may be used. Among them, typically preferred is the high cis-polybutadiene having cis-1,4 bond in a proportion of 40% by mass or more, more preferably 70% by mass or more, even more preferably 90% by mass or more in view of its superior resilience property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and preferably 3 parts by mass or less, more preferably 2 parts by mass or less based on 100 parts by mass of the base rubber. If the amount is less than 0.2 part by mass, the core becomes too soft, and the resilience tends to be lowered, and if the amount is more than 3 parts by mass, the amount of co-crosslinking agent needs to be increased in order to obtain an appropriate hardness, so that the resilience tends to be insufficient.

The co-crosslinking agent is not particularly limited as long as it has the effect of crosslinking a rubber molecule by graft polymerization with a base rubber molecular chain; for example, $\alpha,\beta$-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, alumi num and sodium may be used, and among them, zinc is preferred because it provides high resilience.

The amount of the co-crosslinking agent to be used is preferably 10 parts by mass or more, more preferably 20 parts by mass or more, and is preferably 50 parts by mass or less, more preferably 40 parts by mass or less based on 100 parts by mass of the base rubber. If the amount of the co-crosslinking agent to be used is less than 10 parts by mass, the amount of the organic peroxide must be increased to obtain an appropriate hardness which tends to lower the resilience.

On the other hand, if the amount of the co-crosslinking agent to be used is more than 50 parts by mass, the core becomes too hard, so that the shot feeling may be lowered.

The filler contained in the rubber composition for the core is mainly blended as a gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts by mass or more, more preferably 3 parts by mass or more, and preferably 50 parts by mass or less, more preferably 35 parts by mass or less based on 100 parts by mass of the base rubber. If the amount of the filler to be blended is less than 2 parts by mass, it becomes difficult to adjust the weight, while if it is more than 50 parts by mass, the weight ratio of the rubber component becomes small and the resilience tends to be lowered.

As the rubber composition for the core, an organic sulfur compound, an antioxidant or a peptizing agent may be blended as appropriate in addition to the base rubber, the crosslinking initiator, the co-crosslinking agent and the filler.

The amount of organic sulfur compound to be blended is preferably 0.1 part by mass or more, more preferably 0.3 part by mass or more, and preferably 5.0 parts by mass or less, more preferably 3.0 parts by mass or less relative to 100 parts by mass of the base rubber. As the organic sulfur compound, diphenyl disulfides may be preferably used. Examples of the diphenyl disulfides include diphenyl disulfide, a mono-substituted diphenyl disulfide such as bis(4-chlorophenyl)disulfide, bis(3-chlorophenyl)disulfide, bis(4-bromophenyl)disulfide, bis(3-bromophenyl)disulfide, bis(4-fluorophenyl) disulfide, bis(4-iodophenyl)disulfide and bis(4-cyanophenyl) disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl) disulfide, bis(3,5-dibromophenyl)disulfide, bis(2-chloro-5-bromophenyl)disulfide, and bis(2-cyano-5-bromophenyl) disulfide; a tri-substituted diphenyl disulfide such as bis (2,4,6-trichlorophenyl)disulfide, and bis(2-cyano-4-chloro-6-bromophenyl)disulfide; a tetra-substituted diphenyl disulfide such as bis(2,3,5,6-tetrachlorophenyl)disulfide; a penta-substituted diphenyl disulfide such as bis(2,3,4,5,6-pentachlorophenyl)disulfide and bis(2,3,4,5,6-pentabromophenyl)disulfide. These diphenyl disulfides can enhance resilience by having some influence on the state of vulcanization of vulcanized rubber. Among them, diphenyl disulfide and bis(pentabromophenyl)disulfide are preferably used since a golf ball having particularly high resilience can be obtained.

The amount of the antioxidant to be blended is preferably 0.1 part by mass or more and is preferably 1 part by mass or less based on 100 parts by mass of the base rubber. Further, the amount of the peptizing agent is preferably 0.1 part by mass or more and is preferably 5 parts by mass or less based on 100 parts by mass of the base rubber.

The hot press molding conditions for the core rubber composition may be set as appropriate depending on the rubber composition, but, generally, it is preferred that press-molding is carried out for 10 minutes to 60 minutes at the temperature of 130° C. to 200° C. Alternatively, the press is preferably carried out in a two-step heating, for example, for 20 to 40 minutes at the temperature of 130 to 150° C., and continuously for 5 to 15 minutes at the temperature of 160 to 180° C.

The diameter of the core used in the golf ball of the present invention is preferably 39 mm or more, more preferably 39.5 mm or more, and even more preferably 40.8 mm or more, and is preferably 42.2 mm or less, more preferably 42 mm or less, and even more preferably 41.8 mm or less. This is because if the diameter of the core is less than the above lower limit, the cover becomes too thick and hence the resilience deteriorates, and if the diameter of the core is more than the above upper limit, the cover becomes too thick and hence it becomes difficult to mold the cover.

It is preferred that the core in the present invention has a larger surface hardness than the center hardness (when the core consists of multiple layers, it is preferred that the surface hardness of the outermost intermediate layer is larger than the center hardness). Making the surface hardness of the core larger than the center hardness increases the launch angle and decreases the amount of spin, thereby improving the flight distance of the golf ball. In this respect, the Shore D hardness difference between the surface and the center of the core used in the golf ball of the present invention is preferably 20 or more and more preferably 25 or more, and is preferably 40 or less and more preferably 35 or less. If the hardness difference is less than the above lower limit, the flight distance of the golf ball tends to be lower because it is difficult to achieve a large launch angle and a small amount of spin. Further, it is difficult to obtain a soft and good shot feeling because of the large impact that happens when hitting the golf ball. On the other hand, if the hardness difference is more than the above upper limit, the durability of the golf ball tends to be lower.

The center hardness of the core in Shore D hardness is preferably 30 or more, more preferably 32 or more, and even more preferably 35 or more, and is preferably 50 or less, more preferably 48 or less, and even more preferably 45 or less. If the center hardness is less than the above lower limit, the core becomes so soft that the resilience of the golf ball tends to be lower. On the other hand, if the center hardness is more than the above upper limit, the core becomes so hard that the shot feeling deteriorates and the launch angle decreases, and the flight performance of the golf ball deteriorates due to an increased amount of spin. In the present invention, the center hardness of the core is the hardness measured with the Shore D type spring hardness tester at the central point of a cut plane of the core which has been cut into two halves.

The surface hardness of the core in Shore D hardness is preferably 45 or more, more preferably 50 or more, and even more preferably 55 or more, and is preferably 65 or less, more preferably 62 or less, and even more preferably 60 or less. If the surface hardness is less than the above lower limit, the core becomes so soft that the resilience of the golf ball and the launch angle may decrease, and the flight performance of the golf ball may deteriorate due to an increased amount of spin. On the other hand, if the surface hardness is more than the above upper limit, the core becomes so hard that the shot feeling may deteriorate. In the present invention, the surface hardness of the core is the hardness measured with the Shore D type spring hardness tester on the surface of the spherical core. Further, if the core consists of multiple layers, the surface hardness of the core means the surface hardness of the outermost layer of the core.

When the core of the golf ball of the present invention consists of a center and a single-layer intermediate layer which covers the center, or consists of a center and a plurality of intermediate layers or a multi-layer intermediate layer which covers the center, the core rubber composition can be used as a material for the center. The diameter of the center is preferably 30 mm or more and more preferably 32 mm or more, and is preferably 41 mm or less and more preferably 40.5 mm or less. If the diameter of the center is less than 30 mm, the thickness of the intermediate layer or the cover needs to be greater than a desired thickness, and the resilience of the golf ball may be reduced. On the other hand, if the diameter of the center is more than 41 mm, the thickness of the intermediate layer or the cover needs to be smaller than the desired thickness, and the intermediate layer or the cover does not function well.

As a material of the intermediate layer, for example, a thermoplastic polyamide elastomer having a commercial name of "PEBAX (registered trademark) (e.g. "PEBAX 2533")" available from ARKEMA Inc; a thermoplastic polyester elastomer having a commercial name of "HYTREL (registered trademark) (e.g. "HYTREL 3548" and "HYTREL 4047")" available from DU PONT-TORAY Co.; a thermoplastic polyurethane elastomer having a commercial name of "ELASTOLLAN (registered trademark) (e.g." "ELASTOLLAN XNY97A")" available from BASF Japan; and a thermoplastic polystyrene elastomer having a commercial name of "Rabalon (registered trademark)" available from Mitsubishi Chemical Co. may be used in addition to the cured product of the rubber composition and the conventional ionomer resins. Examples of the ionomer resin include an ionomer resin prepared by neutralizing at least a part of carboxyl groups in a copolymer composed of ethylene and α,β-unsaturated carboxylic acid having 3 to 8 carbon atoms with a metal ion, one prepared by neutralizing at least a part of carboxyl groups in a ternary copolymer composed of ethylene, α,β-unsaturated carboxylic acid having 3 to 8 carbon atoms and α,β-unsaturated carboxylic acid ester with a metal ion, or a mixture thereof.

Specific examples of the ionomer resins include, but not limited to, "Himilan (registered trademark) (e.g. Himilan 1555(Na), Himilan 1557(Zn), "Himilan 1605(Na), Himilan 1706(Zn), Himilan 1707(Na), Himilan AM3/711 (Mg) and the like), and examples of the ternary copolymer ionomer resin include Himilan 1856(Na) and Himilan 1855(Zn))" available from MITSUI-DUPONT POLYCHEMICAL CO., LTD.

Further, ionomer resins available from DUPONT CO. include "Surlyn (registered trademark) (e.g. "surlyn 8945 (Na)", "Surlyn 9945(Zn), Surlyn 8140(Na), Surlyn 8150(Na), Surlyn 9120(Zn), Surlyn 9150(Zn), Surlyn 6910 (Mg), Surlyn 6120(Mg), Surlyn 7930(Li), Surlyn 7940(Li), Surlyn AD8546(Li), and examples of the ternary copolymer ionomer resin include Surlyn 8120(Na), Surlyn 8320(Na), Surlyn 9320(Zn), and Surlyn 6320(Mg)", "HPF 1000(Mg), HPF 2000(MG)".

Ionomer resins such as "Iotek(registered trademark) (e.g. Iotek 8000(Na), Iotek 8030(Na), Iotek 7010(Zn), and Iotek 7030(Zn), and examples of the ternary copolymer ionomer resin include Iotek 7510(Zn) and Iotek 7520(Zn)" are available from ExxonMobil Chemical Corporation.

Na, Zn, K, Li, or Mg described in the parentheses after the commercial name of the ionomer resin represents a kind of metal used for neutralization. Further, the intermediate layer may contain a gravity adjusting agent such as barium sulfate and tungsten, antioxidant, and a pigment.

The process for forming the intermediate layer is not particularly limited to a single process. In one example, a composition for forming intermediate layer is molded into hemispherical half shells in advance, and then the core is covered with two half shells and press-molded. In another example, the composition for forming intermediate layer is injection-molded directly onto the core so as to cover the core.

The slab hardness of the intermediate layer of the golf ball of the present invention in Shore D hardness is preferably 40 or more, more preferably 45 or more, and more preferably 50 or more, and is preferably 80 or less, more preferably 70 or less, and even more preferably 65 or less. Making the slab hardness of the intermediate layer equal to or more than 40 in Shore D hardness contributes in increasing the "outer-hardness and inner softness" level of the core, thereby providing a large launch angle and a small amount of spin and hence achieving a large flight distance of the gold ball. On the other hand, making the slab hardness of the intermediate layer equal to or less than 80 in Shore D hardness provides an excellent shot feeling as well as improves the spin performance of the golf ball, thereby improving the controllability of the golf ball. Here, the slab hardness of the intermediate layer is the measured hardness of a sheet of the intermediate layer composition, and is measured by a later-described measuring method. The slab hardness of the cover can be adjusted, for example, by appropriately deciding a combination of the above resin component and the rubber composition, the amount of additives, and the like.

The golf ball of the present invention is not particularly limited on a structure thereof as long as the golf ball includes a core and a cover. Examples of the golf ball of the present invention include a two-piece golf ball comprising a core, and a cover which covers the core; a three-piece golf ball comprising a core consisting of a center and an intermediate layer which covers the center, and a cover which covers the core; a multi-piece golf ball comprising a core consisting of a center and a plurality pieces of intermediate layer or a multi-layer intermediate layer which covers the center, and a cover which covers the core; a thread wound golf ball comprising a thread wound core, and a cover which covers the thread wound core; and the like.

When preparing a wound golf ball in the present invention, a wound core may be used as the core. In that case, for example, a wound core comprising a center formed by curing the above rubber composition for the core and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

EXAMPLES

Hereinafter, the present invention will be described in detail by way of example. The present invention is not limited to examples described below. Various changes and modifications can be made without departing from the spirit and scope of the present invention.

[Evaluation Methods]

(1) Center Hardness (Shore D Hardness)

A type P1 auto loading durometer manufactured by Kobunshi Keiki Co., Ltd., which comprises a Shore D type spring hardness tester which complies to ASTM-D2240 standard, was used to measure the center hardness of the core. A Shore D hardness measured at the central point of a cut surface of the center which has been cut into two semispherical halves were used as the center hardness of the core.

(2) Slab Hardness (Shore D Hardness)

Sheets with a thickness of about 2 mm were produced by hot press molding with the intermediate layer composition, and stored at 23° C. for two weeks. Three or more of these sheets were stacked on one another so as not to be affected by the measuring base on which the sheets were placed, and the stack was measured with a type P1 auto loading durometer manufactured by Kobunshi Keiki Co., Ltd., which comprises a Shore D type spring hardness tester which complies to ASTM-D2240 standard.

(3) GPC Measurement

Gel permeation chromatography was conducted for the polyol component under the following measuring conditions.
Measuring Conditions
  Apparatus: HLC-8120GPC manufactured by Tosoh Corporation
  Eluent: THF
  Temperature: 40° C.
  Column: TSK gel Super HM-M (manufactured by Tosoh Corporation)
  Polyol concentration: 0.2 mass % (polyol/(polyol+THF))
  Sample injection volume: 5 μl
  Flow rate: 0.5 ml/min
  Molecular weight standard: polystyrene (PSt Quick Kit-H, manufactured by Tosoh Corporation)

(4) Scuff Resistance

A commercially available sand wedge was installed on a swing robot manufactured by Golf Laboratories, Inc., and two points of a ball were both hit once at a head speed of 36 m/sec. Each impact point was evaluated and ranked into eight levels based on the following criteria, and the average rank score for the two points was calculated. A smaller score indicates higher scuff resistance.

Evaluation Criteria 0 point: No hitting marks were observed.

1 point: There was peeling at a point (the maximum size is smaller than 3 mm).

2 point: There was peeling at a point (the maximum size is 3 mm or larger).

3 point: There was peeling in a line (the maximum size is 5 mm or larger).

4 point: There was substantial peeling in a line (the maximum size is 5 mm or larger).

5 point: There was deep and wide peeling in a line (the maximum size is 5 mm or larger).

6 point: There was deep and wide peeling which was almost a plane rather than a line.

7 point: A part of the cover was scraped away as a plane.

(5) Amount of Spin

An approach wedge (SRIXON I-302 manufactured by SRI Sports Limited) was installed on a swing robot manufactured by Golf Laboratories, Inc. A golf ball was hit at a head speed of 21 m/sec., and a sequence of photographs of the hit golf ball was taken for measuring the spin rate (rpm). The measurement was conducted ten times for each golf ball, and the average value was regarded as the spin rate.

[Synthesis of Polyurethane]

To have a formulation as shown in Table 3, first, as a high-molecular-weight polyol component, PTMG 2000 ("PTMG-2000SN" (number average molecular weight: 2000), manufactured by Hodogaya Chemical Co., Ltd.) heated to 80° C. and/or PTMG 1000 ("PTMG-1000SN" (number average molecular weight: 1000), manufactured by Hodogaya Chemical Co., Ltd.) heated to 80° C. were added to 4,4'-dicyclohexylmethane diisocyanate ("Desmodur (registered trademark) W" manufactured by Sumika Bayer Urethane Co. Ltd.) heated to 80° C. as a polyisocyanate component. Then, 0.005 parts by mass of dibutyltin dilaurate with respect to 100 parts by mass of the total mass of these materials was added to the mixture. Then, the mixture was stirred at 80° C. for 2 hours under a nitrogen current.

Figure 7:
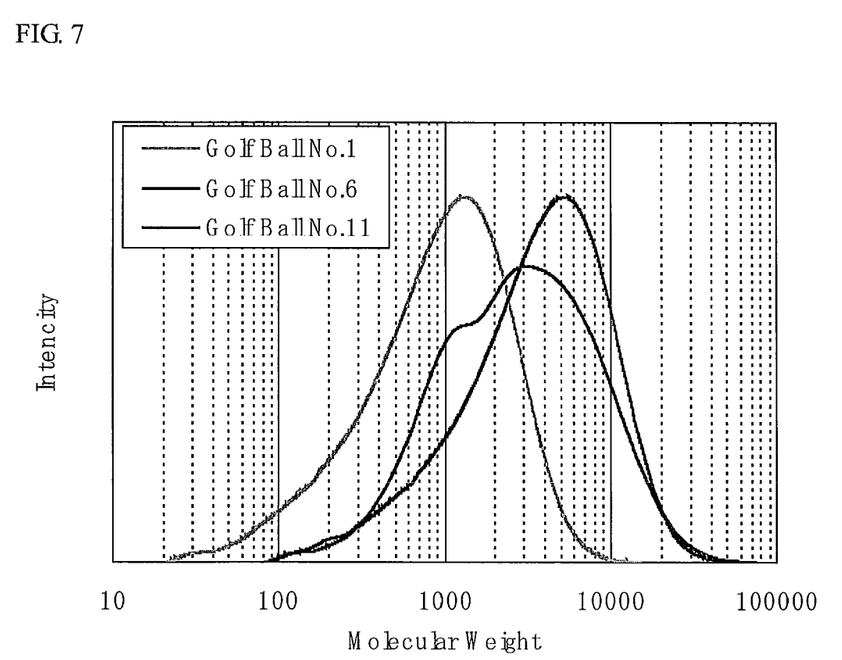
FIG. 7 is a view showing molecular weight distribution curves obtained by gel permeation chromatography for polyols constituting polyurethanes in golf balls No. 1, 6, and 11.

Under a nitrogen current, as a chain extender component 1,4-butanediol (manufactured by Wako Pure Chemical Industries, Ltd.) heated to 80° C. was added to the mixture, and the mixture was stirred at 80° C. for 1 minute. Then, the reaction solution was cooled, the reaction solution was deaerated by reducing pressure for 1 minute at room temperature. The reaction solution after the deaeration was spread out in a container, and then subjected to be preserved at 110° C. for 6 hours under a blanket of nitrogen gas, thereby obtaining polyurethanes each having a formulation shown in FIG. 3. Each polyurethane was synthesized under such a condition that the mole ratio (NCO/OH) of isocyanate group (NCO) contained in the polyisocyanate component to the total amount of hydroxyl group (OH) contained in the high-molecular-weight polyol component and hydroxyl group (OH) contained in the chain extender component is 1.05 to cause the amount of the high-molecular-weight polyol component in the obtained polyurethane to be 40 mass %. The polyol (PTMG 1000 and PTMG 2000 blended as high-molecular-weight polyol components, and 1,4-butanediol blended as the chain extender) was separated from the obtained polyurethane, and gel permeation chromatography measurement was conducted for the polyol. The results are shown in Table 3. The molecular weight distribution curves obtained for golf balls No. 1, 6, and 11 are shown in FIG. 7.

[Production of Golf Ball]

(1) Production of Center

The rubber composition for the center shown in Table 1 was kneaded and heat-pressed with upper and lower molds each having a hemispherical cavity at the heating condition of 170° C. for 15 minutes to obtain a spherical center having a diameter of 38.5 mm and a mass of 34.9 g.

TABLE 1

| | Center | Parts by mass |
|---|---|---|
| Formulation of center rubber composition | Polybutadiene rubber | 100 |
| | Zinc acrylate | 35 |
| | Zinc oxide | 5 |
| | Diphenyl disulfide | 0.5 |
| | Dicumyl peroxide | 1 |
| Properties | Center hardness of core (Shore D hardness) | 40 |

Notes on Table 1:
Polybutadiene rubber: "BR-730 (high-cis polybutadiene)" manufactured by JSR Corporation
Zinc acrylate: "ZNDA-90S" manufactured by Nihon Jyoryu Kogyo Co., Ltd.
Zinc oxide: "Ginrei (registered trademark) R" manufactured by Toho Zinc Co., Ltd.
Dicumyl peroxide: "Percumyl (registered trademark) D" manufactured by NOF Corporation
Diphenyl disulfide: manufactured by Sumitomo Seika Chemicals Co., Ltd.

(2) Blending of Intermediate Layer Material and Cover Composition

Next, an intermediate layer material and a cover composition shown in Tables 2 and 3 were respectively mixed by a twin-screw kneading extruder, thereby preparing an intermediate layer material and a cover composition in the form of pellet. Extrusion was carried out in the following conditions: a screw diameter of 45 mm, a screw rotational speed of 200 rpm, and screw L/D=35, and the mixtures were heated to 150° C. to 230° C. at the die position of the extruder.

TABLE 2

| | Intermediate layer | Parts by mass |
|---|---|---|
| Formulation of intermediate layer composition | Himilan 1605 | 50 |
| | Himilan AM7329 | 50 |
| Properties | Slab hardness (Shore D hardness) | 64 |

Notes on Table 2
Himilan 1605: a sodium ion neutralized ethylene-methacrylic acid copolymer ionomer resin, manufactured by Du Pont-Mitsui Polychemicals Co., Ltd.
Himilan AM7329: a zinc ion neutralized ethylene-methacrylic acid copolymer ionomer resin, manufactured by Du Pont-Mitsui Polychemicals Co., Ltd.

The resultant material for intermediate layer was injection molded onto the center thus obtained to prepare a core having a center and an intermediate layer (a thickness of 1.6 mm) covering the center was produced by injection-molding the obtained intermediate layer composition onto the center obtained thus.

(3) Molding of Half Shells

The half shells were compression molded by charging the cover composition in the form of the pellet obtained as described above into each of depressed parts of lower molds, and applying pressure to mold half shells. The compression molding was carried out under the pressure pressure of 2.94 MPa, at the temperature of 160° C. for 5 minutes.

(4) Cover formation

The core obtained in (2) was covered with the two half shells obtained in (3) in a concentric manner, thereby molding a cover (a thickness of 0.5 mm) by compression molding. The compression molding was conducted at 150° C. for 2 minutes under a molding pressure of 9.8 MPa.

A surface of the obtained golf ball body was subjected to sandblast treatment and marking, and then painted with a clear paint. The paint was dried in an oven at 40° C., and a golf ball with a diameter of 42.7 mm and a mass of 45.3 g was obtained. The evaluation results of scuff resistance and spin performance for the obtained golf balls were shown in Tables 3-1 to 3-3.

TABLE 3-1

| | | Golf ball No. | | | |
|---|---|---|---|---|---|
| | | 1 | 2 | 3 | 4 |
| Formulation of cover composition (parts by mass) | Polyurethane | 100 | | | |
| | Blend ratio of high-molecular-weight polyol component (PTMG 1000/PTMG 2000) (mole ratio) | 10/0 | 9/1 | 8/2 | 7/3 |
| | Titanium dioxide | 4 | | | |
| GPC measurement | Multimodality | Not multimodal | Not multimodal | Not multimodal | Multimodal (bimodal) |
| | Amount ratio obtained from molecular weight distribution curve of polyol (PTMG 1000/PTMG 2000) (mole ratio) | Unmeasurable* | Unmeasurable* | Unmeasurable* | 7/3 |
| Golf ball performance | Scuff resistance (point) | 6 | 6 | 6 | 3 |
| | Spin amount (rpm) | 6000 | 6000 | 6100 | 6200 |

*The mole ratio could not be obtained because peaks could not be separated from each other.

TABLE 3-2

| | | Golf ball No. | | | |
|---|---|---|---|---|---|
| | | 5 | 6 | 7 | 8 |
| Formulation of cover composition (parts by mass) | Polyurethane | 100 | | | |
| | Blend ratio of high-molecular-weight polyol component (PTMG 1000/PTMG 2000) (mole ratio) | 6/4 | 5/5 | 4/6 | 3/7 |
| | Titanium dioxide | 4 | | | |
| GPC measurement | Multimodality | Multimodal (bimodal) | Multimodal (bimodal) | Multimodal (bimodal) | Multimodal (bimodal) |
| | Amount ratio obtained from molecular weight distribution curve of polyol (PTMG 1000/PTMG 2000) (mole ratio) | 6/4 | 5/5 | 4/6 | 3/7 |
| Golf ball performance | Scuff resistance (point) | 2 | 1 | 1 | 2 |
| | Spin amount (rpm) | 6300 | 6400 | 6400 | 6400 |

TABLE 3-3

| | | Golf ball No. | | |
|---|---|---|---|---|
| | | 9 | 10 | 11 |
| Formulation of cover composition (parts by mass) | Polyurethane | 100 | | |
| | Blend ratio of high-molecular-weight polyol component (PTMG 1000/PTMG 2000) (mole ratio) | 2/8 | 1/9 | 0/10 |
| | Titanium dioxide | 4 | | |
| GPC measurement | Multimodality | Multimodal (bimodal) | Not multimodal | Not multimodal |
| | Amount ratio obtained from molecular weight distribution curve of polyol (PTMG 1000/PTMG 2000) (mole ratio) | 2/8 | Unmeasurable* | Unmeasurable* |
| Golf ball performance | Scuff resistance (point) | 3 | 5 | 5 |
| | Spin amount (rpm) | 6400 | 6400 | 6400 |

*The mole ratio could not be obtained because peaks could not be separated from each other.
Notes of Table 3-3
PTMG 1000: PTG-1000SN manufactured by Hodogaya Chemical Co., Ltd.
PTMG 2000: PTG-2000SN manufactured by Hodogaya Chemical Co., Ltd.

Golf balls No. 4 to 9 each have a cover containing, as a resin component, a polyurethane which is obtained by using a multimodal polyol having multimodality in molecular weight distribution, as a high-molecular-weight polyol component constituting the polyurethane. It is obvious that these golf balls No. 4 to 9 have excellent scuff resistance and spin performance.

Golf balls No. 1 to 3, 10, and 11 each has a cover containing, as a resin component, a polyurethane which is obtained by using a polyol having no multimodality in molecular weight distribution, as a high-molecular-weight polyol component constituting the polyurethane. It is obvious that among them, golf balls No. 1 to 3, in which the mole ratio, PTMG 1000/PTMG 2000, in the high-molecular-weight polyol component is 8/2 or more, have inferior scuff resistance and spin performance. Further, it is obvious that golf balls No. 10 and 11, in which the mole ratio, PTMG 1000/PTMG 2000, in the high-molecular-weight polyol component is 1/9 or less, have excellent spin performance but inferior scuff resistance.

The present invention is useful as a golf ball with a polyurethane cover, having excellent spin performance and scuff resistance.

This application is based on Japanese Patent application No. 2008-161921 filed on Jun. 20, 2008, the contents of which are hereby incorporated by reference.

The invention claimed is:

1. A golf ball comprising:
a core; and
a cover covering the core, wherein
the cover contains a polyurethane as a resin component, and
the polyurethane is obtained by employing a multimodal polyol having multimodality in molecular weight distribution, as a high-molecular-weight polyol component constituting the polyurethane;
wherein the multimodal polyol is a mixture of the poly (tetramethylene ether) glycol (PTMG 1000) having a number average molecular weight of 900 to 1100 and a poly(tetramethylene ether) glycol (PTMG 2000) having a number average molecular weight of 1800 to 2200 at a molar ratio of from 3/7 to 6/4 (PTMG 1000/PTMG 2000); and
wherein the polyurethane contains 4,4'-dicyclohexylmethane diisocyanate as a polyisocyanate component constituting the polyurethane.

2. The golf ball according to claim 1, wherein the polyurethane further contains a chain extender as a constituent component.

3. The golf ball according to claim 2, wherein the chain extender is a low-molecular weight polyol having a molecular weight of not more than 400.

4. The golf ball according to claim 2, wherein the chain extender is 1,4-butanediol.

* * * * *